United States Patent [19]

Burlett et al.

[11] Patent Number: 5,189,101
[45] Date of Patent: Feb. 23, 1993

[54] SULFUR VULCANIZED ELASTOMERS REINFORCED WITH ARAMID-POLYDIENE COPOLYMERS

[75] Inventors: Donald J. Burlett, Wadsworth; Richard G. Bauer, Kent, both of Ohio

[73] Assignee: The Goodyear Tire & Rubber Company, Akron, Ohio

[21] Appl. No.: 489,298

[22] Filed: Mar. 5, 1990

[51] Int. Cl.$^5$ .................. C08L 53/00; C08L 47/00
[52] U.S. Cl. ........................... 525/90; 525/179
[58] Field of Search ........................ 525/179, 90

[56] References Cited

U.S. PATENT DOCUMENTS

| | | | |
|---|---|---|---|
| 3,853,796 | 12/1974 | Oldack et al. | 525/90 |
| 4,602,063 | 7/1986 | Yamamoto et al. | 525/133 |
| 4,996,263 | 2/1991 | Pyke et al. | 525/178 |

FOREIGN PATENT DOCUMENTS 0019342  2/1983  Japan ........................ 525/90

OTHER PUBLICATIONS

Journal of Applied Polymer Science, vol. 29, 1984, pp. 2547≧2559: M. Takayanagi et al.
Database Chemical Abstracts, vol. 97, No. 16, 1982.
S. Ogata et al., Macromolecules, 18, pp. 851–855 (1983).
Y. Imai et al., Polymer Journal, 17 (11), pp. 1173–1178 (1985).
S. Ogata et al., Polymer Journal, vol. 17, No. 8, pp. 935–941 (1985).
K. H. Nordsiek, Paper Presented at "IRC 86" Goteborg, Sweden.
Fegade et al., Rubber India, Jan. pp. 19–24 (1985).
Hepburn et al., Int. J. Adhesion and Adhesives, vol. 5, No. 3, Jul. pp. 153–159.
Y. Wu et al., J. Applied Poly Sci., vol. 31, pp. 1041–1059 (1986).
E. H. Burstall et al., J. Chem. Soc., 3570–3579 (1952).
M. Kajiyama et al., Polymer Journal, vol. 18, No., 10, pp. 735–740 (1986).
H. B. Ozgun et al., European Polymer Journal vol. 22, No. 12, pp. 1009–1014, (1986).
R. Martin et al., Die Angewandte Makromolekulare Chemie, 132, pp. 91–108 (1985).
R. Martin et al., Die Angewandte Makromolekulare Chemie, 133, pp. 121–140 (1985).

*Primary Examiner*—Ana L. Carrillo
*Attorney, Agent, or Firm*—Bruce J. Hendricks

[57] ABSTRACT

The present invention relates to sulfur vulcanized elastomers containing aramid-polydiene copolymers. When compounded with the elastomers, the aramid-polydiene copolymers improve the reinforcing nature of the elastomers.

17 Claims, No Drawings

SULFUR VULCANIZED ELASTOMERS REINFORCED WITH ARAMID-POLYDIENE COPOLYMERS

BACKGROUND OF THE INVENTION

Manufacturers of elastomers have long been aware of the benefits from mixing materials into elastomers. Compounders use carbon black and nonblack pigments for a number of purposes, most important of which is the improvement of the mechanical properties of the elastomers. Materials which are used to increase an elastomer's strength, hardness, stiffness, etc. are known as reinforcing agents. Nonblack reinforcement agents for elastomers include hydrated silica, calcium silicate, zinc oxide, the fine particle size precipitated calcium carbonates and clay. Although physical characteristics, such as particle size and surface area are important in determining the effect a reinforcing agent has in an elastomer compound, other properties are important. For example, the adhesion between the reinforcement agent and the matrix of the elastomer is important. Whereas many of the conventional reinforcing agents have been found suitable, it is believed that these reinforcing agents do not actually form a chemical bond with the matrix of the elastomer. Therefore, it is desirable to find a reinforcing agent which is not only compatible with the matrix of the elastomer but one which is believed to form a chemical bond to the matrix of the elastomer.

DETAILED DESCRIPTION OF THE PREFERRED EMBODIMENT

The present invention relates to a process of reinforcing a sulfur vulcanizable elastomer comprising admixing with a sulfur vulcanizable elastomer from about 0.5 to about 70 parts per hundred parts of elastomer, of a copolymer of the structural formula:

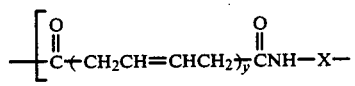

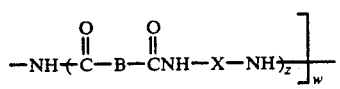

wherein w is an integer of from 1 to 100, y is an integer of from 10 to 500; z is an integer of from 1 to 120; X is:

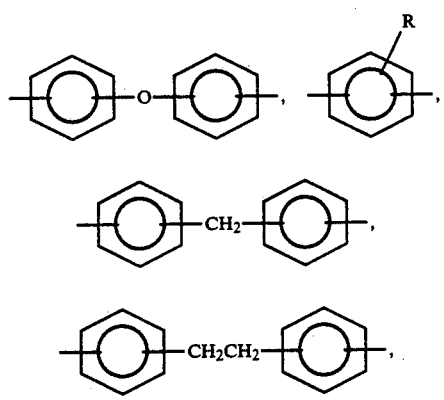

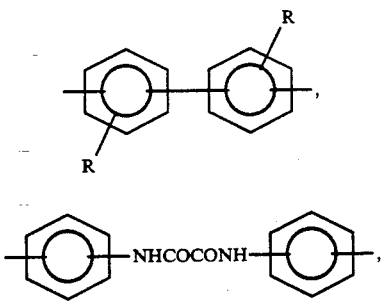

or mixtures thereof; B is:

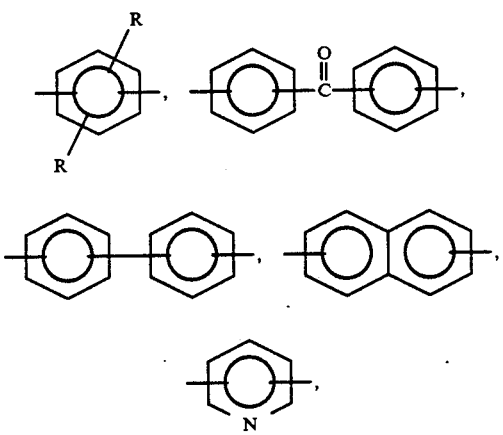

or mixtures thereof and wherein R is selected from the group consisting of H, Cl or CH$_3$.

The present invention also relates to a reinforced vulcanizate comprising:
(a) a sulfur vulcanized elastomer; and
(b) from about 0.5 to about 70 parts per hundred parts of elastomer, of a copolymer of the structural formula:

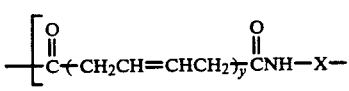

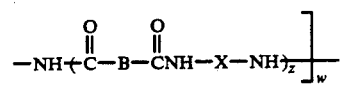

wherein w is an integer of from 1 to 100; y is an integer of from 10 to 500; z is an integer of from 1 to 120; X is:

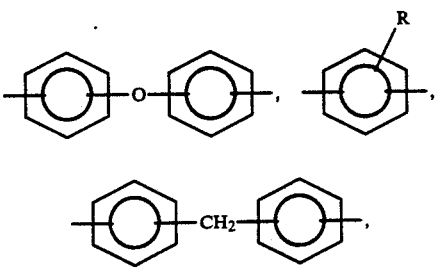

-continued

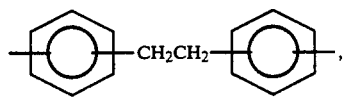

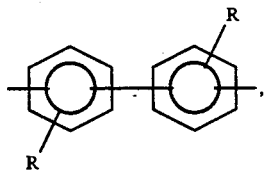

or mixtures thereof; B is:

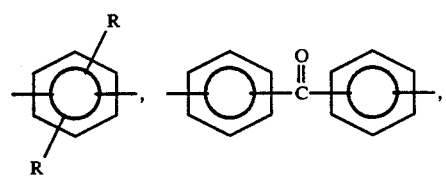

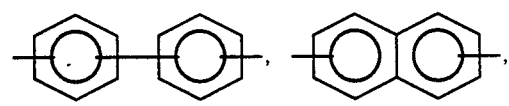

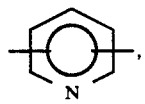

or mixtures thereof; and wherein R is selected from the group consisting of H, Cl or CH$_3$.

In addition, there is disclosed a vulcanizable rubber stock comprising:
(a) a sulfur vulcanizable elastomer; and
(b) from about 0.5 to about 70 parts per hundred of elastomer, of a copolymer of the structural formula:

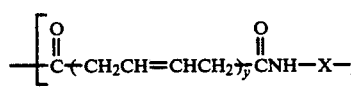

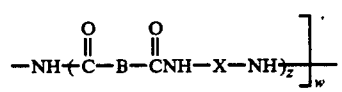

wherein w is an integer of from about 1 to about 100; y is an integer of from 10 to 500; z is an integer of from 1 to 120; X is:

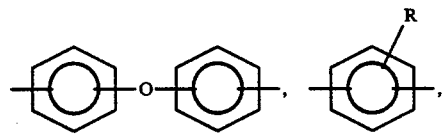

-continued

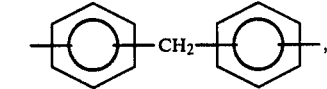

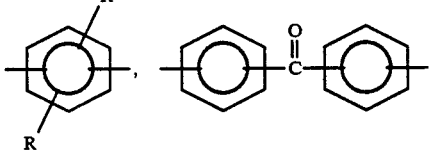

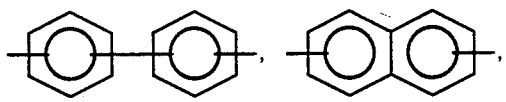

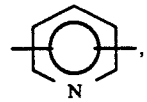

or mixtures thereof; B is:

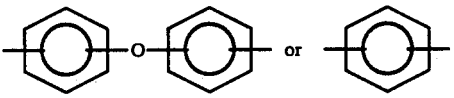

or mixtures thereof; and wherein R is selected from the group consisting of H, Cl or CH$_3$.

With respect to the above formula for the multiblock copolymer, w is preferably an integer of from 1 to 25; y is preferably an integer of from 70 to 90; z is preferably an integer of from 4 to 100; and X is:

and B is:

The aramid-polydiene copolymers for use in the present invention may have a wide range of molecular weights. Generally speaking, the number average molecular weight may range from about 1,000 to about 1,000,000. Preferably, the number average molecular weight ranges from about 10,000 to about 100,000. Specific examples of these aramid-polydiene copolymers are described in Ogata et al, Macromolecules, 18, 851 (1985); Ogata et al, Polymer Journal, 17(11) 1173 (1985) and Ogata et al, Polymer Journal, 17, (8), 935 (1985).

The aramid-polydiene copolymers for use in the present invention are prepared by the direct polycondensation of liquid α,ω-polybutadienedicarboxylic acid and an amine-terminated aramid oligomer. The α,ω-polybutadienedicarboxylic acid (LPB-diacid) that is commercially available from The B. F. Goodrich Company under the designation Hycar CPB may be used to prepare the multiblock copolymers. These LPB-diacids generally have a number average molecular weight ranging from about 4800 to about 5200. The amine-terminated aramid oligomer is derived from the polycondensation reaction between (a) an aromatic dicarboxylic acid, and (b) an aromatic diamine. The aromatic dicarboxylic acids that may be used include those conventionally used to form polyamides such as those disclosed in Encyclopedia of Polymer Science and Engineering, Vol. 11, pp. 381–409, (1988) J. Wiley & Sons Inc. Specific examples of aromatic dicarboxylic acids include:

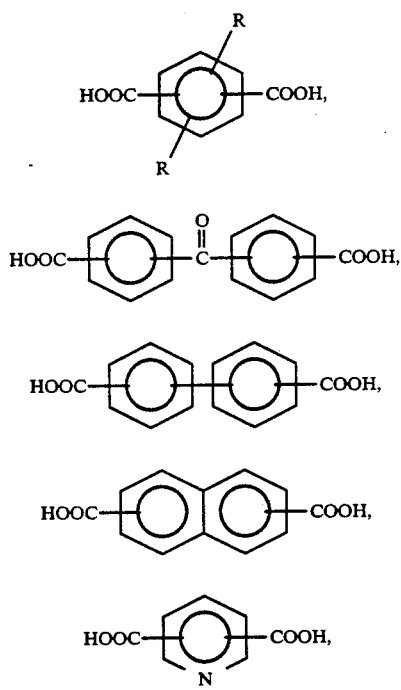

or mixtures thereof wherein R is H, Cl or CH$_3$. The preferred aromatic dicarboxylic acid or chloride thereof is terephthalic acid and terephthaloyl chloride. Specific examples of aromatic diamines which may be used to prepare the amine terminated oligomer include:

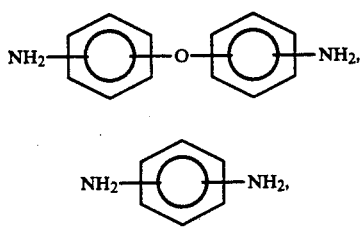

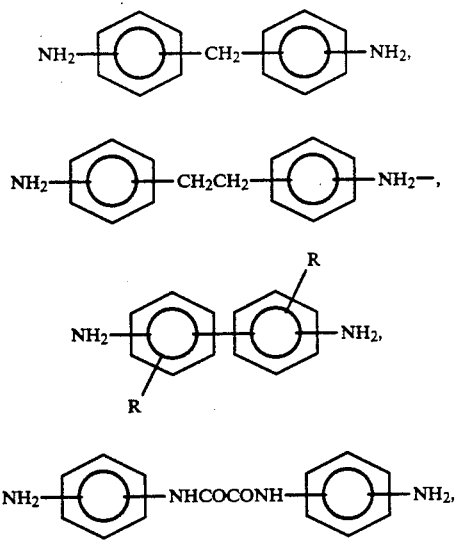

or mixtures thereof and wherein R is H, Cl or CH$_3$. Of the above, preferably the aromatic diamine is 3,4'-oxydianiline, 4,4'-oxydianiline, 1,4-p-phenylenediamine, 1,3-o-phenylenediamine or mixtures thereof. The amine-terminated aramid oligomer may be prepared by the polycondensation reaction between an aromatic dicarboxylic acid or chloride thereof and a stoichiometric excess of the aromatic amine in the presence of a condensing agent. So long as there is a molar excess, the molar ratio of the aromatic amine to the aromatic dicarboxylic acid or chloride thereof may vary. Generally speaking, the molar ratio of the aromatic amine to aromatic dicarboxylic acid ranges from about 1.01 to about 1.75 with a range of from about 1.01 to about 1.05 being preferred. The number average molecular weight of the amine-terminated oligomer may vary depending on the molar ratio of the reactants, duration of the reaction and the like. Generally speaking, the number average molecular weight of the amine-terminated oligomers range from about 900 to 5100.

One advantage of the present invention is that one can vary the properties of the reinforced sulfur vulcanizable or vulcanized elastomer by controlling the relative weight percentages of the aramid blocks and the polybutadiene blocks in the multiblock copolymer. For example, the multiblock copolymer may contain from about 10 to about 90 weight percent of the aramid block, with the balance of the multiblock copolymer being the polybutadiene block. If the weight percent of the aramid block is above 50 weight percent, the amount of reinforcement decreases and preparation of the multiblock copolymer becomes more difficult due to formation of free aramid (non-block). On the other hand, if the weight percent of the aramid block is below 10 weight percent, there is poor vulcanizate properties since larger amounts of the multiblock copolymer are needed to introduce the same level of aramid block. Preferably, the weight percent of the aramid block ranges from about 10 to about 50, with the polybutadiene blocks ranging from about 90 to about 50 weight percent of the multiblock copolymer. A particularly preferred multiblock copolymer is when the weight percent of an aramid block ranges from about 20 to about 30 with the polybutadiene block ranging from about 80 to about 70 weight percent.

The term "rubber" or "elastomer" as used herein embraces polybutadiene. Such recently developed rubbers include those that have polymer bound functionality such as antioxidants and antiozonants. These polymer bound materials are known in the art and can have functionalities that provide antidegradative properties, synergism, and other properties.

The present invention includes the use of various amounts of the aramid-polydiene copolymer. An advantage of the present invention is one can control the relative weight ratios of the aramid-polydiene copolymer and the sulfur vulcanizable elastomer to arrive at the desired physical properties, having taken into consideration the particular aramid-polydiene copolymer and the particular sulfur vulcanizable elastomer. The amount of the aramid-polydiene copolymer that may be added to the vulcanizable elastomer may vary but generally ranges from about 0.5 to about 70 parts per hundred parts of elastomer. Preferably, the amount of aramid-polydiene elastomer that is added to the vulcanizate ranges from about 10 to about 60 parts.

The aramid-polydiene copolymer is mixed with the elastomer prior to sulfur vulcanization in a manner similar to that used for conventional reinforcing agents, such as carbon black. The methods include incorporating the aramid-polydiene copolymer in the nonproductive stock and mixing the stock in a Banbury.

Use of the aramid-polydiene copolymer in a sulfur vulcanizable elastomer results in higher levels of reinforcement compared with the use of conventional fillers, e.g., carbon black. Therefore, the present invention is particularly suited for rubber stocks for use in hoses, belts and tires and in particular in the areas of the carcass, apex, chafer, bead as well as a wirecoat. Prior to vulcanization, it is believed that there is an improvement in green strength in the compounded rubber. In the compounded rubbers that have been vulcanized, there are improvements in tensile properties.

With increasing amounts of the aramid-polydiene copolymer, one may reduce the amount of conventional reinforcements, such as carbon black. However, the reinforced elastomers compounded with the aramid-polydiene copolymers may further contain conventional amounts of a carbon black, silica, zinc oxide, tackifiers, methylene donors and acceptors, peptizing agents, oils, waxes, antioxidants, antiozonants, accelerators and retarders. The amount of each conventional additive will vary depending on the application, and desired application, i.e., carcass, chafer and the like, as known to those skilled in the art. The additives may be compounded with the reinforced elastomer in a manner known to those skilled in the art.

Vulcanization of the reinforced elastomers containing the aramid-polydiene copolymer may be conducted at conventional temperatures used for vulcanizable materials. For example, temperatures may range from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

The vulcanization of the vulcanizable elastomer/aramid-polydiene copolymer mixtures is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. Conventional amounts of the sulfur vulcanizing agents may be used in a manner known to those skilled in the art.

The following examples are presented in order to illustrate but not limit the present invention.

EXAMPLE 1

Preparation of Aramid-Polydiene Copolymer Having 75 Percent by Weight Polybutadiene Units and 25 Percent by Weight Aramid Units In a 2 liter three-neck round bottom reaction flask was placed 4.55 grams of 1,4-p-phenylenediamine, 4.62 grams of terephthalic acid, 2.31 grams of lithium chloride, 7.07 grams of calcium chloride, 200 milliliters of pyridine and 280 milliliters of N-methyl pyrrolidone. In another flask, 29.4 grams of Hycar CTB (4200 molecular weight) was dissolved in 500 milliliters of pyridine and then added to the reaction flask. The reaction flask was purged with nitrogen and 43.4 grams of triphenyl phosphite was added. The reaction mixture was heated with stirring at 95°-100° C. for 16 hours. The mixture was then cooled to room temperature and poured slowly into 2 liters of methanol containing 0.5% by weight of a phenolic antioxidant. The methanol slurry was stirred for 1-2 hours after which the product was collected by filtration and washed with methanol. A yield of 36.9 grams of vacuum dried aramid-polydiene copolymer was isolated.

EXAMPLE 2

Preparation of Aramid-Polydiene Copolymer Having 33 Percent by Weight Polybutadiene Units and 67 Percent by Weight Aramid Units In a 2 liter three-neck round bottom reaction flask was placed 8.4 grams of Hycar CTB in 300 ml of pyridine. To this mixture was added 9.84 grams of terephthalic acid, 6.84 grams of p-phenylene diamine, 2.64 grams of LiCl, 8.08 grams of calcium chloride and 160 milliliters of N-methylpyrrolidone. The mixture was stirred and then 49.6 grams of triphenylphosphite and 100 milliliters of pyridine were added. The mixture was stirred for approximately 20 hours at a temperature of 100° C. The mixture was cooled and filtered. The solid product was combined with 1.5 liters of methanol containing 5 percent by weight of a phenolic antioxidant. The methanol slurry was stirred for 1-2 hours after which the product was collected by filtration and washed with methanol. A yield of 24.2 grams of vacuum dried aramid-polydiene copolymer was isolated.

EXAMPLE 3

Preparation of Aramid-Polydiene Copolymer Having 25 Percent by Weight Polybutadiene Units and 75 Percent by Weight Aramid Units The process of Example 2 was repeated except 5.25 grams of Hycar CTB was used.

EXAMPLE 4

Preparation of Aramid-Polydiene Copolymer Having 16 Percent by Weight Polybutadiene Units and 75 Percent by Weight Aramid Units The process of Example 2 was repeated except 3.00 grams of Hycar CTB was used.

EXAMPLE 5

Preparation of Polymer Having 100 Percent by Weight Aramid Units

In a 250 milliliter flask were placed 1.71 grams of p-phenylenediamine, 2.46 grams terephthalic acid, 12.4 grams of triphenylphosphite, 0.66 grams of LiCl, 2.02 grams of calcium chloride, 100 milliliters of pyridine and 40 milliliters of N-methyl pyrrolidone. The mixture was stirred at 95° C. for 20 hours after which the mixture was cooled and filtered. The solid product was slurried in methanol, filtered and vacuum dried to yield 3.6 grams of product.

EXAMPLE 6

Rubber stocks were prepared and contained medium vinyl polybutadiene, carbon black and either 100% aramid (prepared in accordance with Example 5), 16/84 PBD/aramid (Example 4), 33/67 PBD/aramid (Example 2) or 75/25 PBD/aramid (Example 3). The rubber stocks also contained conventional amounts of stearic acid, wax, antiozonant, oil, sulfur, antioxidant, zinc oxide, primary accelerator and secondary accelerator. The rubber stocks were prepared in a Brabender mixer using two separate stages of addition. The sulfur and accelerator were added to the compounds during the second stage of mixing. The aramid polymer, 75/25 PBD/aramid copolymer, 33/67 PBD/aramid copolymer, or 16/84 PBD/aramid copolymer were added to the Banbury during the first stage of mixing.

Table I sets out the amounts by weight of the rubber, carbon black, and aramid or aramid-polydiene copolymer for each example. In addition, Table I lists the cure behavior and vulcanizate properties of the various rubber stocks.

(Samples 2–3 and 9–10) produces a significant increase in reinforcement as shown by the stress at 100% elongation (3.6 MPa vs. 2.0 MPa for the "free" aramid and 1.3 MPa for the control). It can also be seen that increasing the amount of polybutadiene in the block copolymer leads to a further increase in the reinforcement as shown by the stress at 100% elongation for the 75% polybutadiene analog (6.7 MPa for Sample 4 vs. 3.6 MPa for 33% for Sample 3 or 16% polybutadiene in Sample 2). As can be appreciated, the additional polybutadiene in the block copolymer makes incorporation easier and produces different reinforcement values. The data also indicates that with increasing levels of aramid from the block copolymer, there is an increase in the degree of reinforcement and that all increases in reinforcement values are accompanied by a drop in ultimate tensile/elongation. The data also illustrates that using aramid-polybutadiene block copolymers to replace carbon black, at these low levels, results in a modest increase in reinforcement with no change in hysteresis (tan delta values) and the higher polybutadiene content analog produced a slightly higher reinforcement in this part for part exchange.

What is claimed is:

1. A process for reinforcing a sulfur vulcanizable elastomer comprising admixing a sulfur vulcanizable elastomer with from about 0.5 to about 70 parts per hundred parts of elastomer, of a multiblock copolymer of the structural formula:

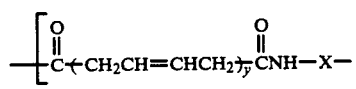

TABLE I

| Sample | C | 1 | 2 | 3 | 4 | 5 | 6 | 7 | 8 | 9 | 10 |
|---|---|---|---|---|---|---|---|---|---|---|---|
| Rubber (parts) | 100 | 100 | 100 | 100 | 100 | 100 | 100 | 100 | 100 | 100 | 100 |
| Carbon Black (phr)[1] | 45.0 | 45.0 | 45.0 | 47.3 | 64.2 | 46.7 | 49.8 | 47.7 | 50.0 | 35.6 | 36.7 |
| 100% Aramid (phr)[1] | 0 | 3.5 | 0 | 0 | 0 | 0 | 0 | 0 | 10.1 | 0 | 0 |
| 16/84 PBD-Aramid (phr)[1] | 0 | 0 | 12.1 | 0 | 0 | 24.9 | 0 | 38.0 | 0 | 12.1 | 0 |
| 33/67 PBD-Aramid (phr)[1] | 0 | 0 | 0 | 15.8 | 0 | 0 | 33.2 | 0 | 0 | 0 | 15.8 |
| 75/25 PBD-Aramid (phr)[1] | 0 | 0 | 0 | 0 | 57.2 | 0 | 0 | 0 | 0 | 0 | 0 |
| Aramid (phr)[2] | 0 | 3.5 | 3.5 | 3.5 | 3.5 | 7.0 | 7.0 | 10.4 | 3.5 | 3.5 | 3.5 |
| Rheometer @ 150° C. | | | | | | | | | | | |
| Min. Torque | 8.0 | 8.4 | 7.5 | 15.7 | 27.4 | 15.9 | 22.1 | 19.2 | 8.9 | 8.5 | 9.2 |
| Max. Torque | 23.3 | 22.8 | 25.7 | 31.6 | 37.3 | 29.7 | 33.6 | 27.4 | 22.4 | 23.9 | 25.0 |
| T2 | 7.0 | 9.9 | 9.2 | 7.4 | 7.6 | 12.3 | 12.7 | 17.3 | 9.3 | 10.3 | 8.8 |
| T25 | 8.4 | 11.5 | 9.0 | 8.9 | 8.4 | 14.7 | 14.6 | 17.7 | 10.8 | 12.3 | 10.8 |
| T90 | 26.5 | 29.7 | 28.9 | 28.2 | 34.5 | 41.7 | 35.7 | 39.8 | 24.0 | 33.7 | 30.2 |
| Tensile Properties | | | | | | | | | | | |
| Ult. Elongation % | 500 | 520 | 390 | 310 | 130 | 325 | 200 | 245 | 500 | 570 | 510 |
| Stress @ Break MPa | 12.1 | 17.9 | 15.8 | 14.3 | 8.6 | 10.3 | 9.8 | 5.0 | 15.5 | 11.4 | 11.6 |
| 100% Elongation MPa | 1.3 | 2.0 | 3.6 | 3.6 | 6.7 | 3.1 | 5.4 | 2.4 | 2.1 | 1.4 | 1.6 |
| 200% Elongation MPa | 3.1 | 5.1 | 7.9 | 8.7 | — | 6.7 | 9.8 | 4.3 | 5.0 | 3.3 | 4.0 |
| 300% Elongation MPa | 6.3 | 8.9 | 12.2 | 13.8 | .— | 9.6 | — | — | 8.6 | 5.7 | 6.5 |
| Rheovibron @ 0° C. | | | | | | | | | | | |
| Tan Delta | .208 | .213 | .204 | .175 | .162 | .198 | .180 | .200 | .200 | .206 | .212 |
| E' | 8.09 | 7.93 | 7.97 | 8.03 | 8.13 | 8.11 | 8.21 | 8.19 | 8.02 | 7.92 | 7.96 |
| E'' | 7.41 | 7.26 | 7.28 | 7.27 | 7.34 | 7.41 | 7.47 | 7.49 | 7.32 | 7.23 | 7.29 |
| Rheovibron @ 60° C. | | | | | | | | | | | |
| Tan Delta | .125 | .123 | .122 | .119 | .115 | .147 | .144 | .174 | .130 | .132 | .122 |
| E' | 7.75 | 7.66 | 7.74 | 7.81 | 7.87 | 7.85 | 8.01 | 7.84 | 7.72 | 7.67 | 7.65 |
| E'' | 6.85 | 6.74 | 6.82 | 6.89 | 6.93 | 7.02 | 7.17 | 7.08 | 6.84 | 6.79 | 6.74 |

[1] phr of total aramid or total multiblock copolymer per 100 parts by weight of vulcanizable elastomer.
[2] phr of aramid to total vulcanizable elastomer including that contributed by the polybutadiene unit of the multiblock copolymer.

As can be seen from Table I, addition of free aramid (Sample 1 and 8) does result in a small increase in modulus, as expected from the addition of a filler to the compound. However, introduction of the same amount of aramid via the aramid-polybutadiene block copolymer

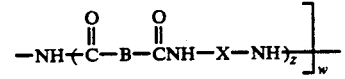

wherein w is n integer of from 1 to 100; y is an integer of from 10 to 500; z is an integer of from 1 to 120; X is:

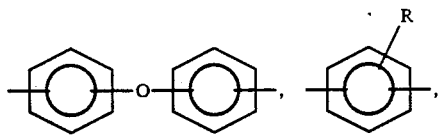

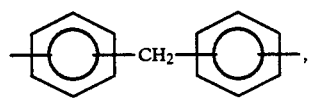

or mixtures thereof; B is:

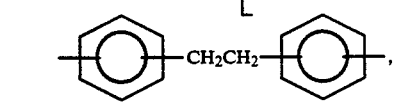

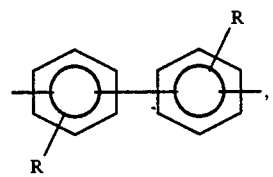

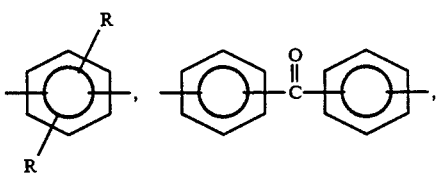

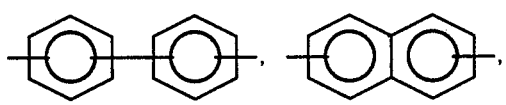

or mixtures thereof; and wherein R is selected from the group consisting of H, Cl or $CH_3$; and wherein said sulfur vulcanizable elastomer comprises polybutadiene.

2. The process of claim 1 wherein from about 10 to about 60 parts of said copolymer is used.

3. The process of claim 1 wherein w is an integer of from 1 to 25; y is an integer of from 70 to 90; z is an integer of from 4 to 100.

4. The process of claim 1 wherein X is:

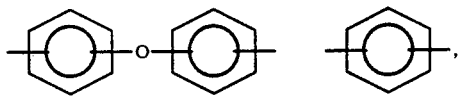

or mixtures thereof.

5. The process of claim 1 where B is:

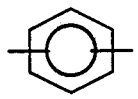

6. The process of claim 1 wherein said multiblock copolymer is of the structural formula:

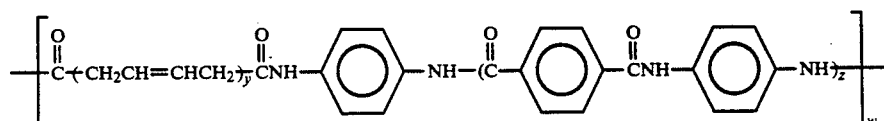

7. A reinforced vulcanizate comprising:
(a) a sulfur vulcanized elastomer comprising polybutadiene, and
(b) from about 0.5 to about 70 parts per hundred of elastomer, of a multiblock copolymer of the structural formula:

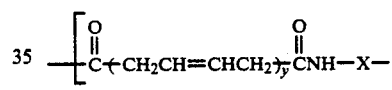

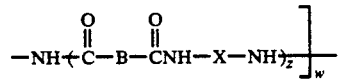

wherein w is an integer of from 1 to 100; y is an integer of from 10 to 500; z is an integer of from 1 to 120; X is:

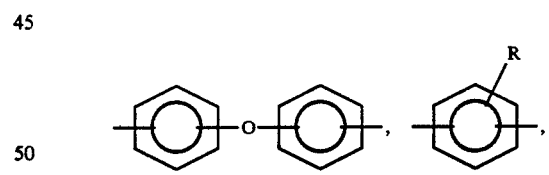

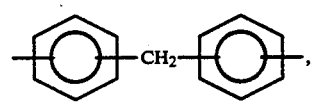

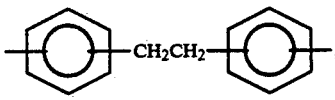

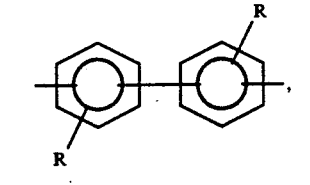

or mixtures thereof; B is:

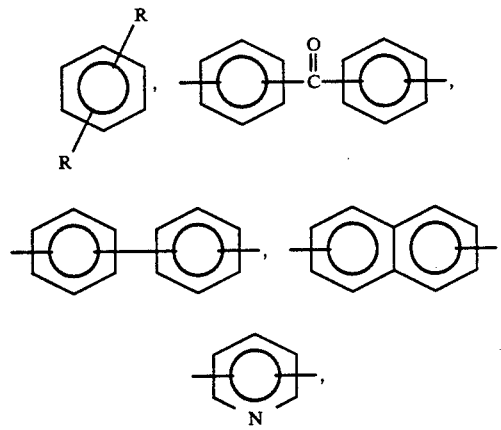

or mixtures thereof; and wherein R is selected from the group consisting of H, Cl or CH₃.

8. The vulcanizate of claim 7 wherein from about 10 to about 60 parts of said copolymer is used.

9. The vulcanizate of claim 7 wherein w is an integer of from 1 to 25; y is an integer of from 70 to 90; and z is an integer of from 4 to 100.

10. The vulcanizate of claim 9 wherein X is:

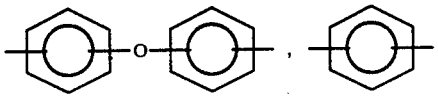

or mixtures thereof.

11. The vulcanizate of claim 7 where B is:

12. The vulcanizate of claim 7 wherein said multi-block copolymer is of the structural formula:

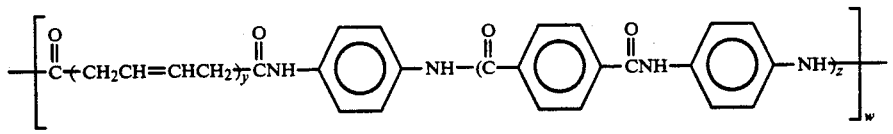

13. A vulcanizable rubber stock comprising:
(a) a sulfur vulcanizable elastomer comprising polybutadiene; and
(b) from about 0.5 to about 70 parts per hundred of elastomer, of a copolymer of the structural formula:

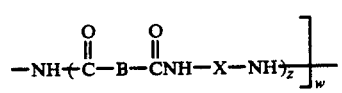

wherein w is an integer of from 1 to 100; y is an integer of from 10 to 500; z is an integer of from 1 to 120; X is:

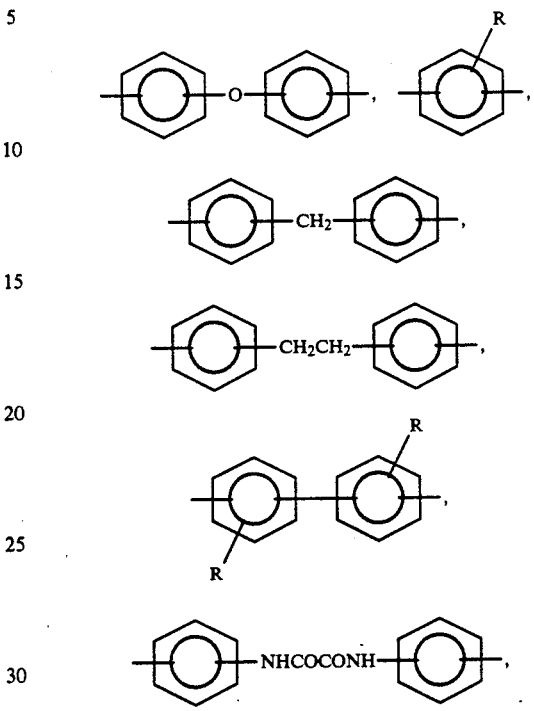

or mixtures thereof; B is:

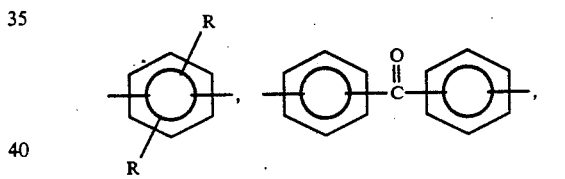

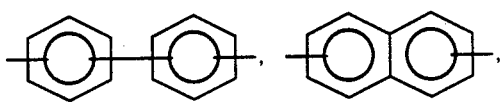

or mixtures thereof; and wherein R is selected from the group consisting of H, Cl or CH₃.

14. The vulcanizable rubber stock of claim 13 wherein from about 10 to about 60 parts of said copolymer is used.

15. The vulcanizable rubber stock of claim 13 wherein w is an integer of from 1 to 25; y is an integer of from 70 to 90; and z is an integer of from 4 to 100.

16. The vulcanizable rubber stock of claim 13 wherein X is:
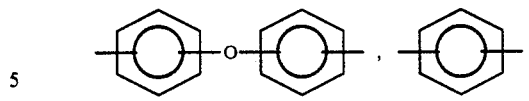
or mixtures thereof.
17. The vulcanizable rubber stock of claim 13 wherein said multiblock copolymer is of the structural formula:
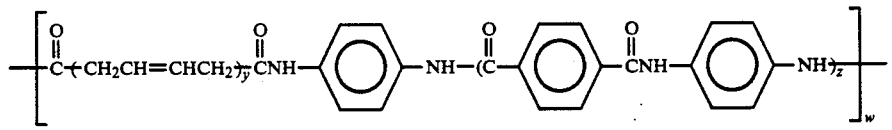
* * * * *